US010843289B2

(12) United States Patent
Tedeschi et al.

(10) Patent No.: US 10,843,289 B2
(45) Date of Patent: Nov. 24, 2020

(54) DEVICES FOR FEEDING ELECTRODE CAPSULES

(71) Applicant: SINTERLEGHE S.R.L., Turin (IT)

(72) Inventors: Eugenio Tedeschi, Turin (IT); Giuseppe Palopoli, Borgomanero (IT); Emmanuele Ottoni, Turin (IT)

(73) Assignee: SINTERLEGHE S.R.L. (IT)

( * ) Notice: Subject to any disclaimer, the term of this patent is extended or adjusted under 35 U.S.C. 154(b) by 663 days.

(21) Appl. No.: 15/021,274

(22) PCT Filed: Sep. 12, 2014

(86) PCT No.: PCT/IB2014/064469
§ 371 (c)(1),
(2) Date: Mar. 11, 2016

(87) PCT Pub. No.: WO2015/036971
PCT Pub. Date: Mar. 19, 2015

(65) Prior Publication Data
US 2016/0221112 A1    Aug. 4, 2016

(30) Foreign Application Priority Data

Sep. 13, 2013 (IT) .............................. TO2013A0746

(51) Int. Cl.
*B23K 11/30*    (2006.01)
*B23K 11/11*    (2006.01)

(52) U.S. Cl.
CPC ......... *B23K 11/3072* (2013.01); *B23K 11/115* (2013.01)

(58) Field of Classification Search
None
See application file for complete search history.

(56) References Cited

U.S. PATENT DOCUMENTS

| 5,073,692 A * | 12/1991 | Jackson | B23K 11/3072 219/86.7 |
| 5,387,774 A * | 2/1995 | Boyer | B23K 11/3018 219/117.1 |
| 5,734,141 A * | 3/1998 | Voilmy | B23K 11/3072 219/86.25 |
| 6,184,487 B1 * | 2/2001 | Visscher | B23K 11/30 219/91.1 |

(Continued)

FOREIGN PATENT DOCUMENTS

| DE | 10209343 A1 * | 9/2003 | ............. B23B 5/166 |
| DE | 10222248 | * 11/2003 | |

(Continued)

*Primary Examiner* — Serkan Akar
*Assistant Examiner* — Elizabeth M Sims
(74) *Attorney, Agent, or Firm* — Valauskas Corder LLP

(57) ABSTRACT

Devices which shorten the time needed for the assembly of electrode capsules on welding grippers are provided. Such devices may have two stations for withdrawal of electrode capsules. The withdrawal stations may have a mirror-image arrangement with respect to a given intermediate plane and may be situated in a peripheral zone of the apparatus. Two guide ducts may house two respective rows of electrode capsules. Two prechambers can be provided, each one being arranged between the associated withdrawal station and an outlet end of the associated guide duct. A retractable stop pin may be mounted between each prechamber and the associated withdrawal station, said pin, when extracted, blocking an electrode capsule inside the withdrawal station. To transfer an electrode capsule from the prechamber to the associated withdrawal station, the apparatus may be provided with two positioning devices which can be selectively operated in order to accomplish this.

7 Claims, 10 Drawing Sheets

(56) References Cited

U.S. PATENT DOCUMENTS

| | | | | |
|---|---|---|---|---|
| 2002/0017552 A1* | 2/2002 | Ishida | .................... | B23K 3/082 |
| | | | | 228/207 |
| 2004/0216604 A1* | 11/2004 | Bennett | ................. | B21D 22/21 |
| | | | | 92/172 |
| 2008/0190899 A1* | 8/2008 | Sugahara | ................ | B23K 11/11 |
| | | | | 219/86.25 |
| 2009/0165641 A1* | 7/2009 | Lemaire | ................. | B23P 15/10 |
| | | | | 92/172 |
| 2010/0108743 A1* | 5/2010 | Kwon | ................ | B23K 9/0286 |
| | | | | 228/102 |
| 2011/0144675 A1* | 6/2011 | Gao | .................... | A61F 9/00736 |
| | | | | 606/167 |
| 2012/0118790 A1* | 5/2012 | Braeuer | ............. | B23K 11/3072 |
| | | | | 206/722 |

FOREIGN PATENT DOCUMENTS

| | | | | | |
|---|---|---|---|---|---|
| DE | 10222248 | A1 | | 11/2003 | |
| DE | 102012201671 | | * | 8/2013 | |
| DE | 102012201671 | A1 | | 8/2013 | |
| EP | 2072170 | A1 | | 6/2009 | |
| EP | 2072170 | A1 | * | 6/2009 | ......... B23K 11/3072 |
| FR | 2874523 | | * | 3/2006 | |
| FR | 2874523 | A1 | | 3/2006 | |
| FR | 2895926 | A1 | * | 7/2007 | ......... B23K 11/3072 |
| FR | 2895926 | A1 | | 7/2007 | |
| JP | 6-9777 | | * | 2/1994 | |
| JP | H069777 | U | | 2/1994 | |
| JP | 2006026649 | A | * | 2/2006 | |
| JP | 2006026649 | A | | 2/2006 | |
| JP | 2010036205 | A | * | 2/2010 | |

\* cited by examiner

DEVICES FOR FEEDING ELECTRODE CAPSULES

CROSS REFERENCE TO RELATED APPLICATIONS

This application is a National Phase Application of PCT International Application No. PCT/IB2014/064469, International Filing Date, Sep. 12, 2014, claiming priority to Italian Patent Application No. TO2013A000746 (102013902190156), filed Sep. 13, 2013, each of which is hereby incorporated by reference in its entirety.

FIELD OF THE INVENTION

The present invention falls generally within the sector of spot-welding performed by automated apparatus. In particular, the invention relates to an apparatus for feeding electrode capsules suitable for replacing worn electrode capsules mounted on the robot welding grippers and/or on grippers which are fixed to the ground.

BACKGROUND OF THE INVENTION

In many production lines, in particular in the automobile construction sector, widespread use is made of resistance spot-welding, using welding grippers which are mounted on robot arms and/or fixed to the ground. Each welding gripper is provided with two electrode capsules which can be arranged against each other and which have a generally convex and cylindrical shape each with a conical recess forming a seat which allows forced mounting of said capsule onto a shank or conical support lug (or electrode-holder shank) of the welding gripper. The electrode capsules are subject to considerable wear and therefore must be frequently replaced with new electrode capsules.

During recent years different types of apparatus (or "magazines") for feeding electrode capsules have been proposed, these being designed to contain a plurality of new electrodes to be mounted on the welding grippers for replacement of worn electrode capsules.

DE 102 22 248 A1 describes a gravity feeding apparatus comprising a pair of cartridge units, each containing a series of electrode capsules. Each cartridge unit is oriented in a substantially vertical manner and is contained, partially, in a sliding manner, inside a fixed casing. The cartridge units gradually slide downwards as the electrode capsules are removed. This type of apparatus occupies a large volume owing to the cartridge units which, being extracted from the bottom, increase the risk of collision with the robot arm carrying the welding gripper, or with sheet metal parts which are moved into the vicinity of the apparatus.

US 2012/0118790 A1 describes an apparatus for feeding electrode capsules, comprising two guides which are designed to house two respective rows of capsules, and two capsule withdrawal stations, where each withdrawal station is adjacent to a respective outlet end of the guides. The two guides are diagonally staggered, as are the two withdrawal stations, from where the electrode capsules are removed in two successive steps by a welding gripper. The apparatus is provided with spring-type thrust means associated with the guides for pushing the electrode capsules contained in the guides towards the withdrawals stations.

EP 2 072 170 A1 discloses a known feeding apparatus comprising two drum cartridge units rotating about respective parallel axes.

JP H06 9777 U describes an apparatus for feeding electrode capsules having two guide ducts, inside which two rows of electrode capsules are loaded, and two withdrawal stations in a mirror-image arrangement with respect to an intermediate plane. Pressurised air is supplied via a single connection. The pressurised air acts on two piston elements which are slidable along the guide ducts and push the electrode capsules towards the withdrawal stations.

With the feeding apparatus which hitherto have been mainly used, the welding gripper must first be brought into the vicinity of one of the two withdrawal stations, in order to fit temporarily a new electrode onto one of the two electrode-holder shanks. In this condition, the electrode capsule is temporarily fastened in a loose manner on the shank. The gripper is moved away, in order to extract the electrode capsule from the apparatus (magazine) and is then closed, bringing the new electrode into contact with the opposite electrode, in order to stably fix the new electrode on the shank. Once this forced engagement has been performed, the gripper must be brought into a remote position, in order to release the second worn electrode, and must then be moved towards a second withdrawal position from where a second electrode capsule may be removed, and then closed up again in order to stably fix the latter onto the gripper. As is known to persons skilled in the art, a gripper must not be closed if the electrode capsules have not yet been fitted, since any gripping force applied would damage the ends of the electrode-holder shanks, obstructing the outlet holes of the coolant supply channels which are usually provided in the welding grippers.

With the currently known feeding apparatus it is not possible to close the welding gripper around the electrode capsules when the capsules are still inside the feeding apparatus in order to fix immediately the electrode capsules onto the gripper; in fact, the significant gripping or closing force applied by the gripper would damage the feeding apparatus or would move it from its predetermined position.

The operations for assembly of the new electrode capsules therefore require relatively long times. Since the electrode capsule is fitted provisionally in a loose manner on the electrode-holder shank when the latter reaches the withdrawal position, there is the risk that the electrode capsule may accidentally fall from the gripper and that the electrode-holder shank may be damaged should the gripper be closed when both the electrode capsules are absent. In order to detect the presence of a new capsule on the electrode-holder stem, magnetic sensors are provided, these being mounted on a stationary part of the plant, towards which the gripper is moved during each cycle after picking up an electrode, in order to check that the new electrode has been loaded.

SUMMARY OF THE INVENTION

It is therefore an object of the invention to provide a feeding apparatus which allows the overall time needed for assembly of the electrode capsules on a welding gripper to be shortened. Another object of the invention is to provide the certainty that a new electrode capsule has been assembled in a stable and correct manner on the electrode-holder shank. A further object of the invention is to reduce the dimensions, eliminate components which are subject to wear (for example springs for pushing the electrode capsules towards the withdrawal stations) and increase the loading capacity of a feeding apparatus, in order to reduce the frequency of the operations for manually loading the electrodes. Yet another object of the invention is to keep the withdrawal stations and the feeding devices clean, in particular by preventing any coolant from trickling down from the exposed electrode-holder shanks.

Furthermore it is desirable that the electrode capsules should be able to be loaded one at a time on the electrode-holder shanks of a gripper. The reason for this is that the coolant which flows through the electrode-holder shanks leaks out when both the electrode capsules of a same welding gripper are simultaneously removed. The capsules act partly as plugs for the cooling liquid circuit. In order to limit the leakages of liquid it is therefore preferable to remove and replace one electrode capsule at a time. It is therefore desirable to optimize the electrode capsule loading operations, without having to move the robot arm and the welding gripper from a position close to the electrode capsule feeding apparatus. Finally, it is desired to provide an electrode capsule feeding apparatus which is able to be varyingly oriented and inclined, so as to adapt in a flexible manner to the requirements and therefore be installed virtually in any position as required by the welding apparatus, thereby achieving the aforementioned objects.

The aforementioned and other objects and advantages, which will be clarified in greater detail below, are achieved according to the invention by an apparatus for feeding electrodes as described and claimed herein.

In short, a feeding apparatus which has two electrode capsule withdrawal stations is proposed. The stations have a substantially mirror-image arrangement with respect to a given intermediate plane and are situated in a peripheral zone of the apparatus. Two guide ducts house two respective rows of electrode capsules. Each guide duct has an inlet end for introduction of the electrode capsules and an outlet end close to the respective withdrawal station. Two prechambers are provided, each one adjacent to and communicating with a respective outlet end of one of the guide ducts and a respective withdrawal station; each prechamber is arranged between the associated withdrawal station and the associated guide duct. A retractable stop pin is mounted between each prechamber and the associated withdrawal station, said pin, when extracted, preventing an electrode capsule from being transferred from the prechamber to the withdrawal station. In order to transfer an electrode capsule from the prechamber to the associated withdrawal station, the apparatus is provided with two positioning devices which can be selectively operated. Two pneumatic connections are each connected to a guide duct in the proximity of the respective inlet ends, so as to introduce selectively and independently separate compressed-gas flows into either one of the guide ducts so that the compressed-gas flows directly push the electrode capsules contained in the chosen guide duct and cause it to advance towards the respective withdrawal station.

The apparatus allows a reduction in the programming times for the robot movement, such that its movements will be fewer. Various movements which are conventionally performed by a welding gripper are in fact eliminated, namely the movement between the two withdrawal stations, which conventionally are separate, in order to load each electrode, and the locations where the sensors are provided for detecting the presence of the electrode capsules on the gripper. With a single operation, the welding gripper closes around a pair of new electrodes, which both remain forcibly engaged on the electrode-holder shanks.

Functional and structural characteristics of certain embodiments of feeding devices according to the invention will now be described with reference to the attached drawings.

DETAILED DESCRIPTION

Figure 1:
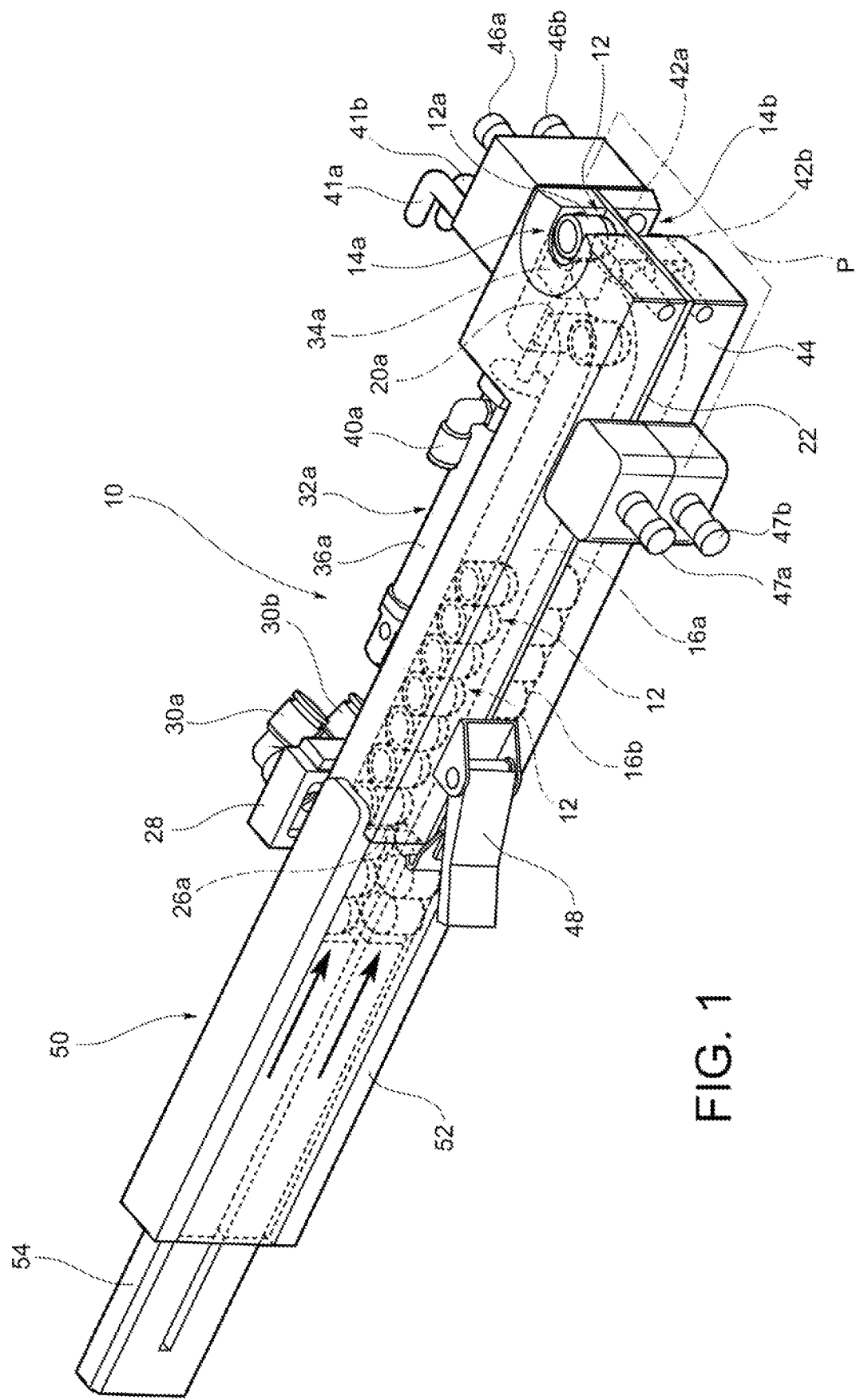
FIG. 1 shows a diagrammatic perspective view of an electrode capsule feeding apparatus in a loading condition.

With reference initially to FIG. 1, the number 10 denotes in its entirety a feeding apparatus for feeding electrode capsules 12 towards two withdrawal stations 14a, 14b. The withdrawal stations 14a, 14b are situated in a peripheral zone of the apparatus, in the vicinity of its outer edge, so that a welding gripper (not shown) may reach a station where both electrode-holder shanks of the gripper may easily access both the withdrawal stations 14a, 14b.

The apparatus 10 comprises two guide ducts 16a, 16b, each suitable for housing a respective row of electrode capsules. The two withdrawal stations 14a, 14b are each situated adjacent to a respective outlet end 20a, 20b of the guide ducts.

According to a particularly compact embodiment, the guide ducts 16a, 16b are parallel and adjacent to each other.

In the particular embodiment shown in the accompanying drawings, the two guide ducts 16a, 16b are separated from each other by an intermediate plate 22.

The feeding apparatus shown in the drawings is intended to feed electrode capsules loaded in two rows and has a structure which is symmetrical with respect to the intermediate plate 22 or at least to the plane P in which it lies. The description which follows will be provided almost exclusively with reference to one of the two symmetrical parts of the structure, it being understood that the part not described is to be regarded as being identical or substantially identical to the part described. The reference numbers used to indicate elements belonging to the top part of the apparatus are indicated by the suffix "a". Not all the elements belonging to the bottom half are visible in the drawings, but are mentioned with the same reference number used for the corresponding element of the top part, but with the suffix "b".

It will therefore be clear that the choice of providing a symmetrical structure as well as the use of given types of actuators and sensors constitute preferred choices in some application conditions, but certainly are not imperative for the purposes of implementing the invention.

The two withdrawal stations 14 have a substantially mirror-image arrangement with respect to a given plane. This plane may be formed by the intermediate plate 22. The withdrawal stations 14a, 14b are situated on opposite sides with respect to the intermediate plate 22 or the plane P.

The intermediate plate 22 is optional. According to one embodiment, the intermediate plate 22 may be omitted and the two withdrawal stations have a substantially mirror-image arrangement with respect to the geometrical plane P, where the guide ducts and the electrode capsules 12 are arranged on opposite sides of said plane.

The intermediate plate 22 may be conveniently formed by a metal sheet, for example made of stainless steel, which may have a thickness comparable to the thickness of a pair of sheets to be welded together. For example, considering that two sheets arranged adjacent occupy together a thickness generally of between 2.5 and 5 mm, the plate may have a thickness within this limit values, for example equal to 3 mm.

The intermediate plate 22, since it is advantageously rigid, allows the welding gripper to close such that the electrode-holder shank is introduced into an electrode capsule 12, exerting a closing force with an intensity which is comparable or identical to the closing force which the gripper applies during welding.

Advantageously, the guide ducts and the parts of the apparatus which are situated close to the withdrawal stations are surrounded by a liquid-tight casing 44 which prevents corrosive liquids from damaging the internal parts of the feeding apparatus.

The guide ducts 16a, 16b each have the outlet end 20a, 20b which is adjacent to a withdrawal station 14, and an inlet end 26a, 26b which is situated in a remote position with respect to the withdrawal station.

A prechamber 24a, 24b is adjacent to and communicates with the respective withdrawal station and is situated between the latter and the associated guide duct 16a, 16b. Each prechamber 24a, 24b is associated with a respective retractable stop element 25a, 25b, each able to be selectively operated. In this example the stop elements are formed as pins. Preferably, the stop pins or elements 25a, 25b are operated pneumatically via a respective connection 41a, 41b. Each stop element may be moved between an active or extracted position, where it projects at least partially between the prechamber 24a, 24b and the respective withdrawal station 14a, 14b, and a retracted or passive position. In the extracted condition, the stop element prevents an electrode capsule present in the prechamber 24a, 24b from entering the adjacent withdrawal station 14a, 14b. When the stop element is retracted, the transit of an electrode capsule from the prechamber to the withdrawal station is instead allowed.

As explained further below, the prechambers 24a, 24b and the associated stop elements 25a, 25b have the function of temporarily retaining an electrode capsule arriving from the guide 16a, 16b, in order to keep the associated withdrawal station temporarily empty.

The inlet ends of the guide ducts may be closed by a rotatable lid 28 which may have, mounted thereon, two connections 30a, 30b suitable for being connected to a respective compressed-gas source (not shown), preferably a compressed-air source. In an alternative embodiment (not shown) two lids may be provided, each one of which closes one of the guide ducts 16a, 16b and is connected to one of the connections 30a, 30b.

The compressed-air supply inside each guide duct is independent of the compressed-air supply inside the other guide duct, so that it is possible to cause selectively the advancing movement of the electrode capsules alternately inside one guide duct or the other one.

According to an alternative embodiment (not shown), the two connections 30a, 30b for introduction of compressed gas may be connected not to the lid 28, but to a fixed wall of the guides and/or the casing. In this variant also, the two connections 30a, 30b are located in the vicinity of the inlet ends of the guide ducts (for example, in the vicinity of the lid or lids 28), so that the compressed gas introduced into the guide ducts pushes in an efficient manner all the capsules loaded inside the ducts towards the withdrawal stations.

When the lid 28 is in the closed position (FIG. 3), compressed-gas flows may be selectively and separately introduced into the guide ducts. The two flows are independent of each other and act directly on the electrode capsules, pushing them and causing them to advance towards the withdrawal stations. The compressed-gas flows inside the guide ducts, in addition to causing the advancing movement of the electrode capsules, are useful for blowing away from the withdrawal stations any liquids, typically coolant which may trickle down from the electrode-holder shanks (not shown) which do not have a capsule.

Adjacent to each prechamber 24a, 24b there is a positioning apparatus 32a, 32b which can be operated so as to move a respective electrode capsule from the prechamber 24a, 24b to the associated withdrawal station 14a, 14b, and releasably retain the respective electrode capsule, oriented inside its withdrawal station, in a predetermined direction.

Figure 2:
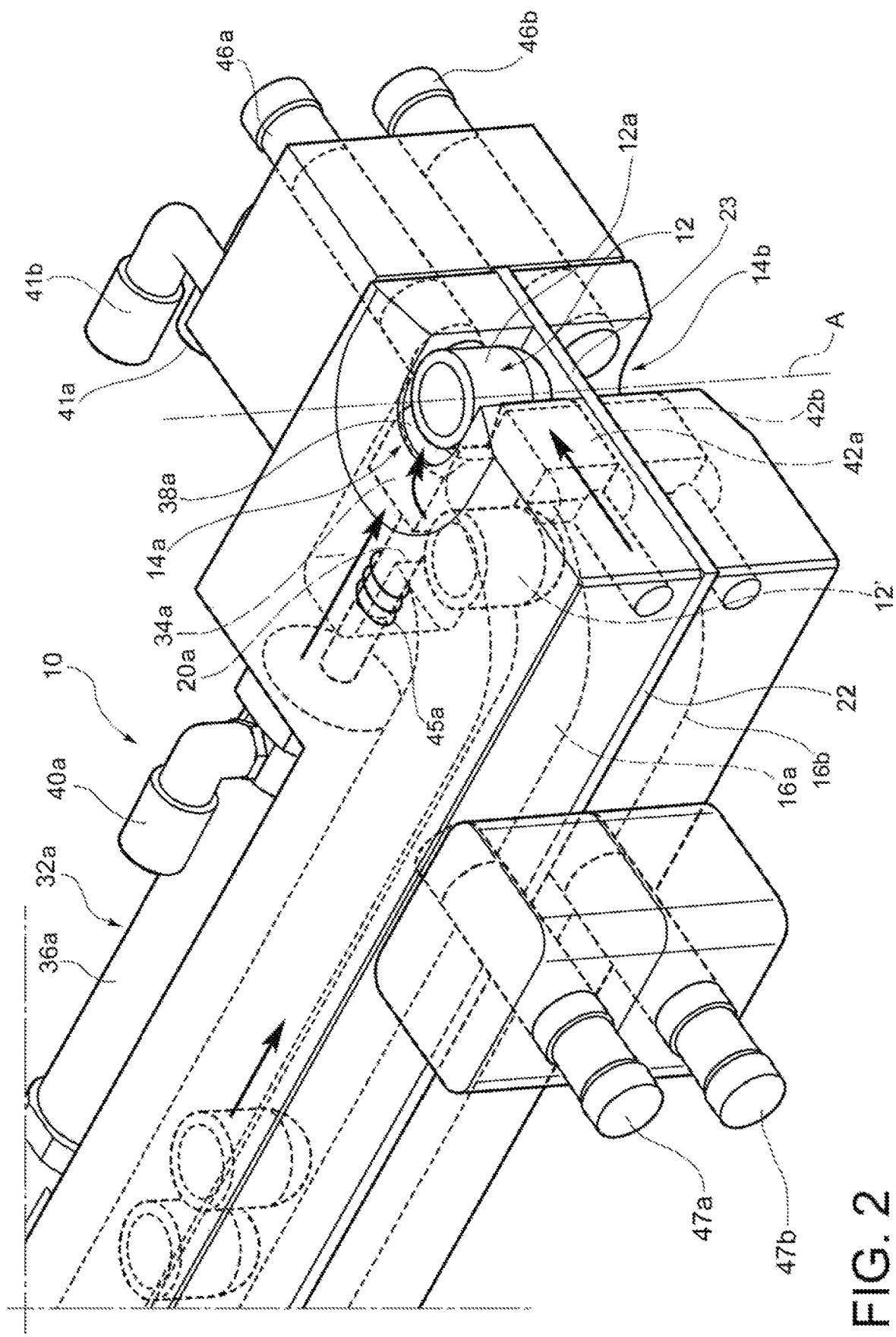
FIG. 2 shows a diagrammatic view, on a larger scale, of a detail of the feeding apparatus shown in FIG. 1.
Figure 3:
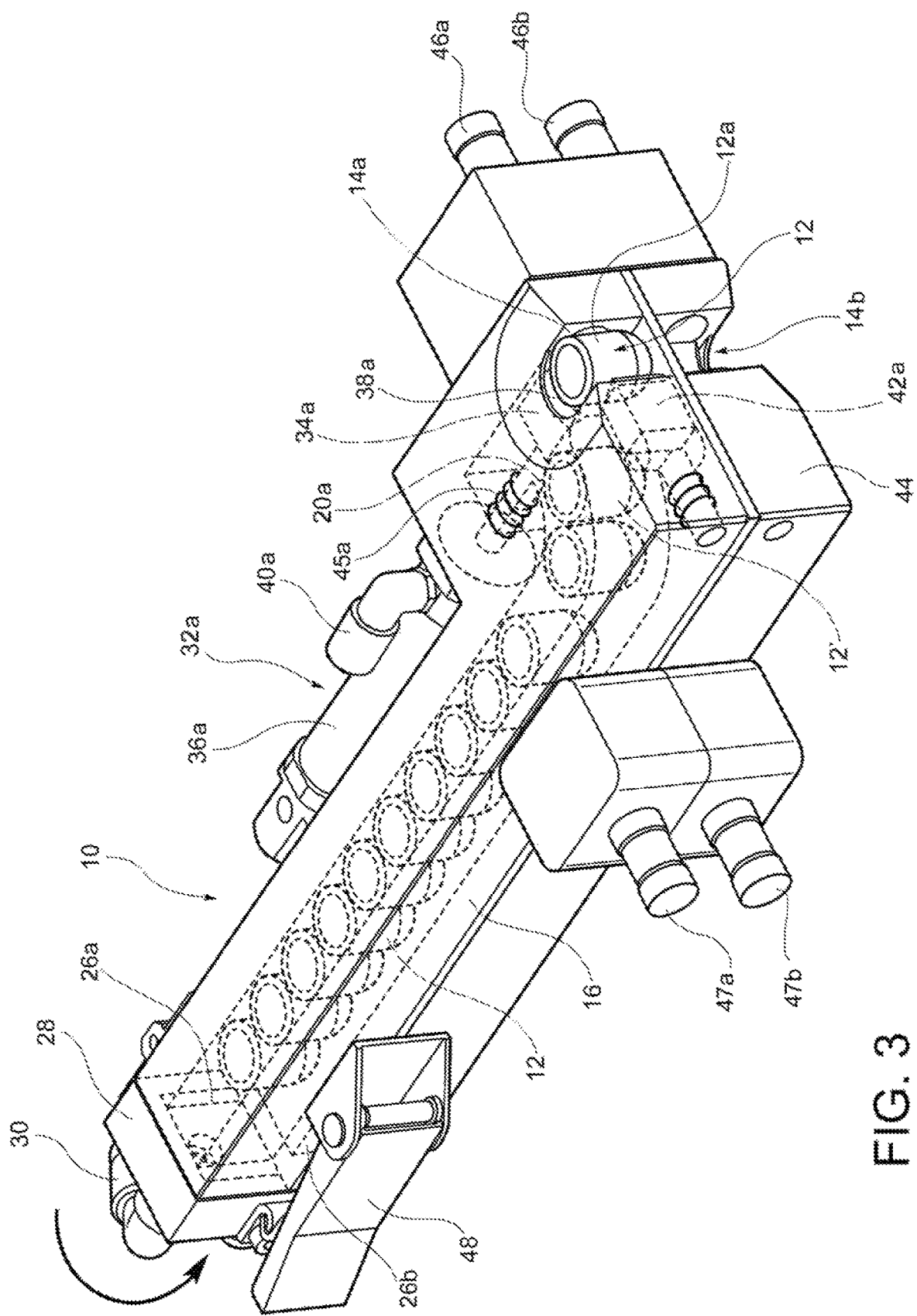
FIG. 3 shows a diagrammatic perspective view of the feeding apparatus according to FIG. 1 in an operating condition.
Figure 4:
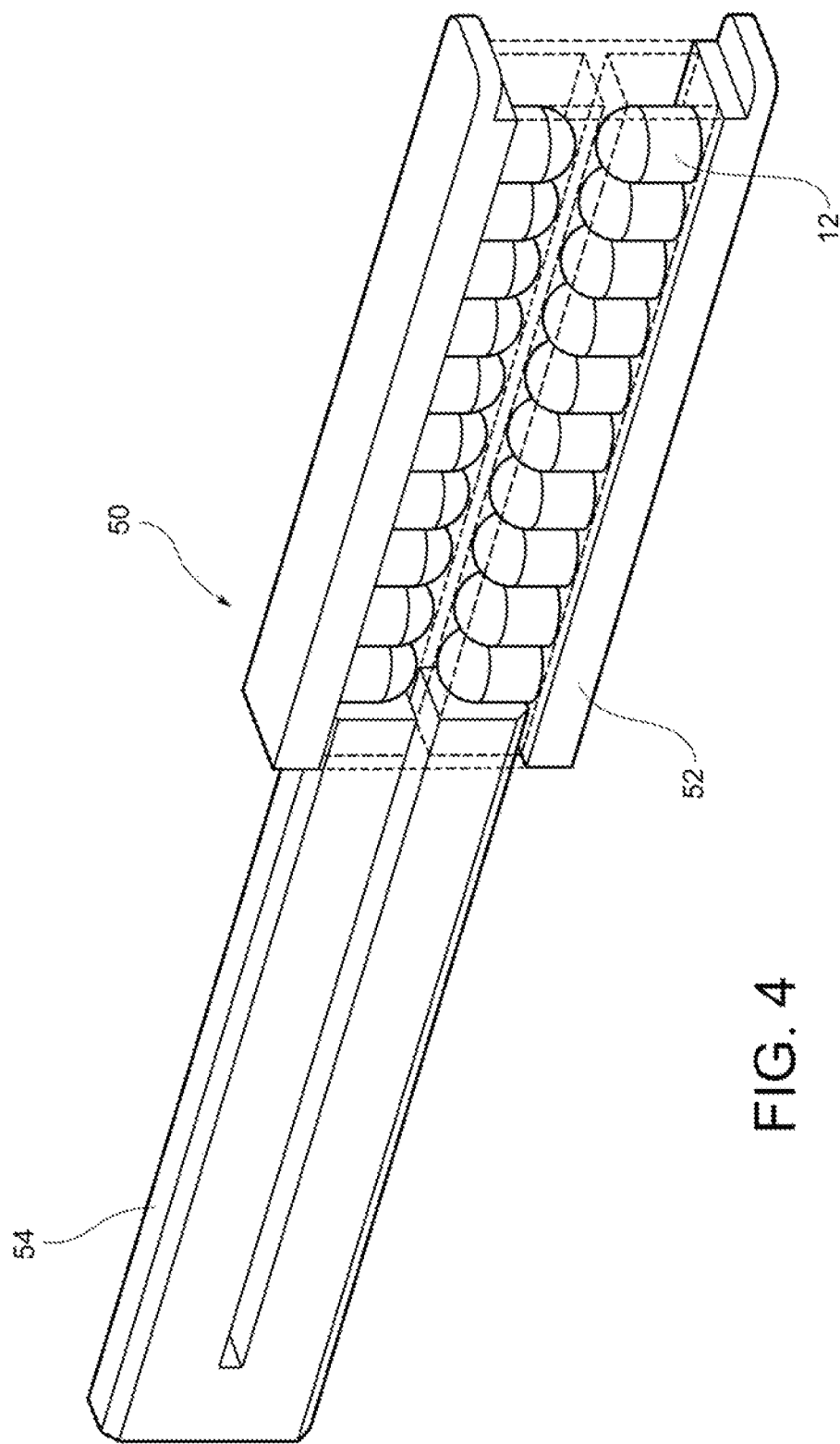
FIG. 4 shows a diagrammatic perspective view of a cartridge unit for loading the feeding apparatus shown in FIG. 1.

In the example shown in FIGS. 1, 2 and 3, the positioning device 32 comprises, for each withdrawal station 14a, 14b, a piston thrust element 34a, 34b, which is moved by a respective linear actuating cylinder 36a, 36b, which is advantageously pneumatically operated, via a respective connection 40a, 40b.

Each piston thrust element 34a, 234b may be associated with an elastic recall element 45a, 45b which tends to bias the piston thrust element towards the withdrawal station.

Preferably, the piston thrust element 34a, 34b has a concave or curved surface 38a, 38b directed towards the withdrawal station.

Figure 5:
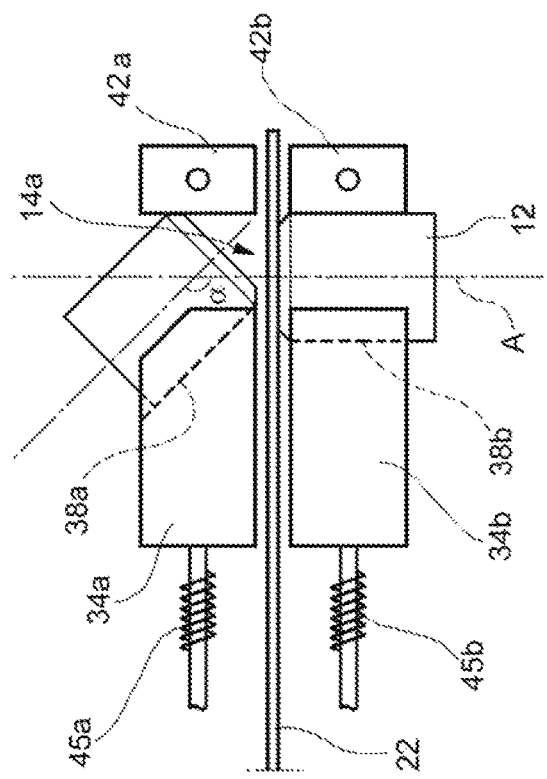
FIG. 5 shows a diagrammatic side view of a portion of the feeding apparatus, according to an embodiment of the invention.

In one embodiment, shown in FIG. 5, where the two electrode capsules are both aligned along a geometrical axis A perpendicular to the intermediate plate 22, the piston thrust elements 34a, 34b may be provided with concave surfaces which are axially aligned along a single, semi-cylindrical or partially cylindrical, geometric surface.

Figure 6:
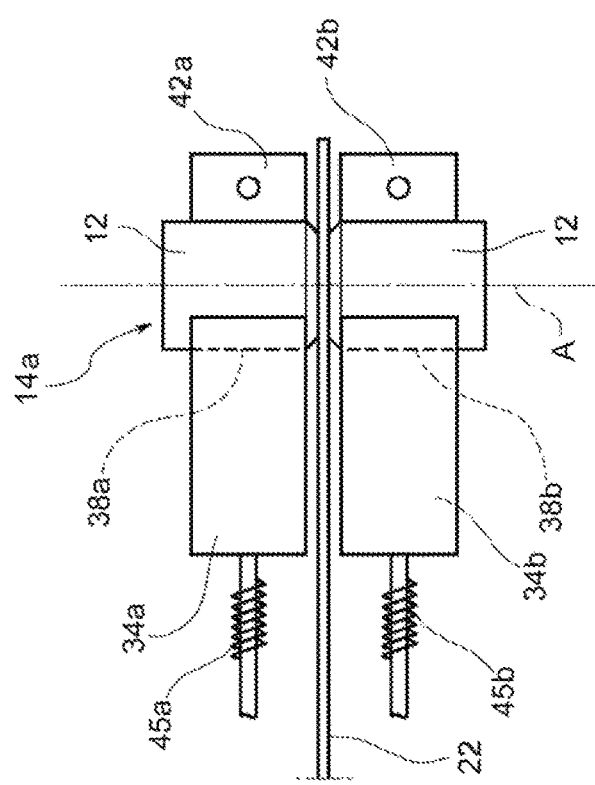
FIG. 6 shows a diagrammatic side view of a portion of the feeding apparatus, according to a further embodiment of the invention.

According to an alternative embodiment, shown in FIG. 6, if the electrode capsules 12 are to be provisionally arranged and retained in the two withdrawal stations, so that the central axes of the two capsules form an obtuse angle α, the curved or concave surfaces 38a, 38b, by means of which the piston thrust elements 34a, 34b push or engage the capsules, may have different inclinations.

Figure 12:
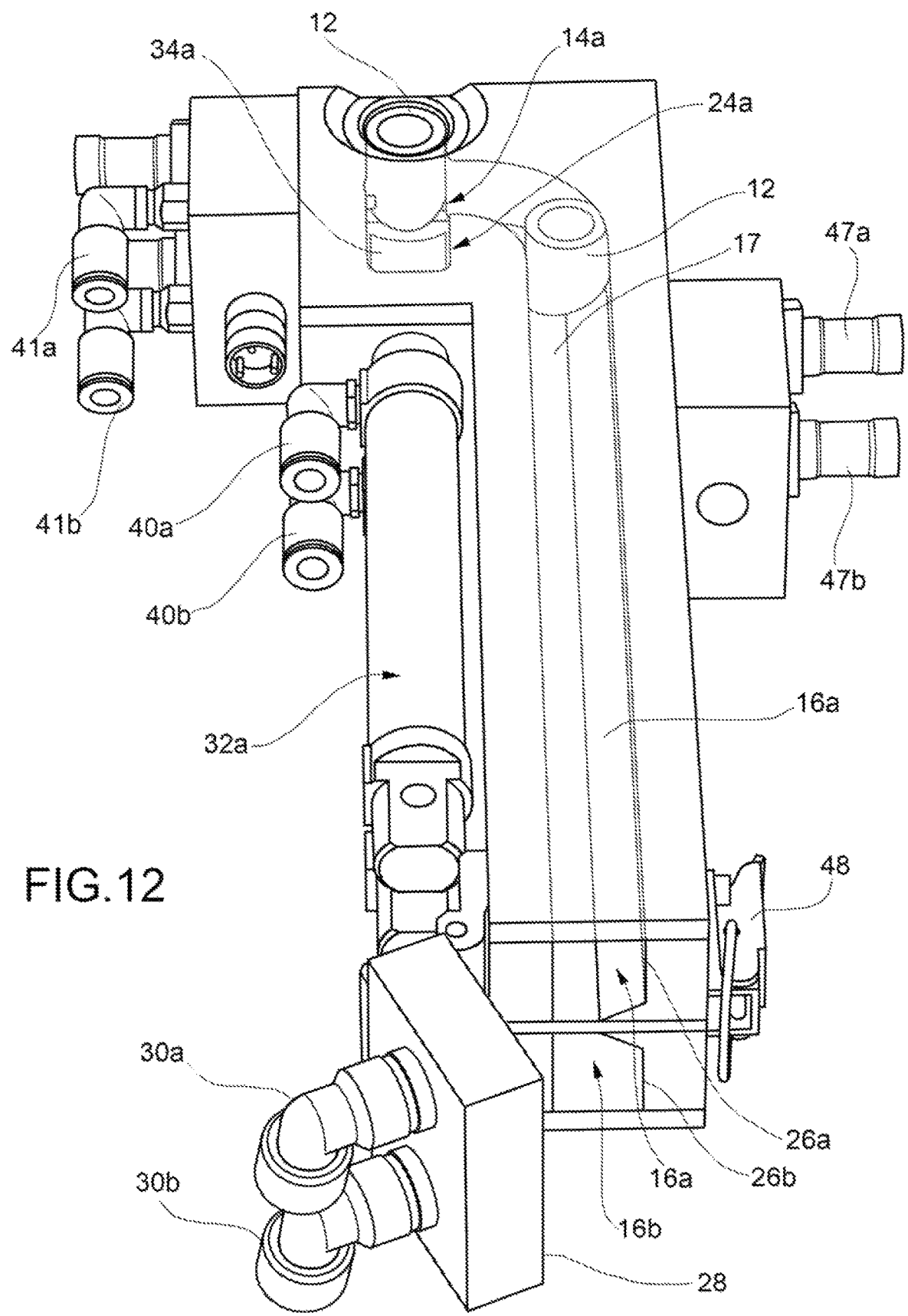
FIG. 12 is a diagrammatic perspective view of an apparatus according to a further alternative embodiment.

Preferably, each guide duct has a cross-sectional form corresponding to the shape of an electrode capsule. For electrode capsules of the symmetrical type the guide duct may be rectangular. For asymmetrical electrode capsules, the guide ducts 16a, 16b may be shaped (FIG. 12) so as to force the capsules to be conveyed inside the prechambers 24a, 24b and then into the withdrawal stations 14a, 14b rotated through a predetermined angle about their vertical axis, in order to be mounted on the electrode gripper with their apices facing each other.

It is preferable that the cross-section of each guide duct should be slightly greater than the area of the shape of an electrode, so that the air blown in through the guide duct may cause a more efficient advancing movement of the electrode capsules in the direction of the prechambers 24a, 24b. Advantageously, the apparatus does not have conventional internal pistons for thrust-feeding the capsules: the compressed-air flows introduced into the guide ducts through the connections 30a, 30b cause directly advancing of the capsules 12 and reach the withdrawal stations, keeping them clean.

According to a preferred embodiment, the withdrawal stations 14a, 14b are arranged in peripheral positions in the vicinity of an edge 23 of the feeding apparatus; the prechambers 24a, 24b are located adjacent to and communicating with the withdrawal stations, being arranged more internally within the apparatus and further from the edge 23 than the withdrawal stations 14a,14b. The piston thrust elements 34a, 34b operate pushing the electrode capsules in a direction which forms an angle, for example an angle of 90°, with a direction of the end sector 19 of the guide ducts. This configuration is advantageous since it makes use of a linear positioning device with a simple constructional design which is effectively able to ensure both movement of the capsules and their desired orientation inside the respective withdrawal station. Moreover, the same piston thrust element 34, in its extended position shown in FIGS. 1, 2 and 3, acts advantageously also as a stop element for preventing more than one electrode at a time entering into the prechamber 24a, 24b. The piston thrust element 34a, 34b prevents the first electrode capsule 12' (FIG. 2) of the row from accessing the prechamber (and therefore the withdrawal station). This prevents jamming of the capsules along their travel path towards the withdrawal station 14a, 14b.

In other embodiments, not shown, it is possible to envisage an additional stop element which is designed to prevent uncontrolled access of the electrode capsule from each guide duct to the prechamber.

According to a particularly compact embodiment, the guide ducts have an essentially L-shaped form in plan view, with a straight main or upstream section 17, which starts from the inlet opening 26, and an end (or downstream) section 19 which is elbow-shaped. The end section 19 of each guide duct forces the electrode capsules to follow an exit path having a direction which forms the aforementioned right angle, allowing the thrust element 34 to act on one side of the electrode capsule so as to push it into the withdrawal station. According to this configuration, the straight sections 17 extend parallel alongside the positioning devices 32, providing the apparatus with particularly compact overall dimensions.

According to a particularly advantageous embodiment from a functional point of view, the compressed-air supply to the connection 30a (or 30b) of one of the two guide ducts 16a (or 16b) is in fluid communication with the compressed-air supply to the connection 40a (or 40b) which causes withdrawal of the piston thrust element 34a (34b) acting on the electrode capsules coming from the guide duct 30a (or 30b).

Even more advantageously, the compressed-air supply to the connection 30a (or 30b) of one of the two guide ducts 16a (or 16b) is also in fluid communication with the compressed-air supply to the connection 41a (or 41b) which causes extension of the stop element 25a (or 25b) which has the function of retaining an electrode capsule in the prechamber 24a (or 24b), preventing the entry thereof into the withdrawal station 14a (or 14b). It is understood that, alternatively, the movements of the piston thrust elements and/or stop elements 25a, 25b may be controlled in another way, for example electrically.

In the example shown in FIGS. 1 to 6, preferably resilient (or pneumatic or electric) retaining teeth 42a, 42b are located in the vicinity of the edge 23 so as to prevent an electrode capsule 12 from falling outside of the respective withdrawal station 14a, 14b. In to this embodiment, the withdrawal station is open laterally. The welding gripper, once the electrode capsule has been fixed, may be moved away laterally, overcoming the action of the retaining teeth 42a, 42b.

Figure 7:
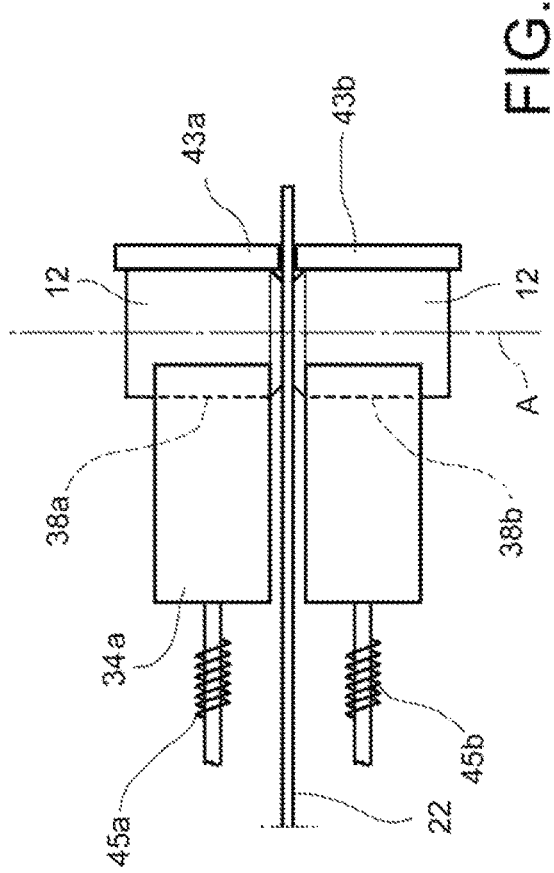
FIG. 7 shows a diagrammatic side view of a portion of the feeding apparatus, according to yet another different embodiment of the invention.

According to a further embodiment, diagrammatically shown in FIG. 7, the withdrawal station 14 may be closed laterally by walls 43 abutting at the end. In this way, the electrode capsule is not extracted laterally, as in the example shown, but removed by moving it away from the intermediate plane P which separates the two withdrawal stations. This withdrawal method is carried out by causing opening of the gripper. According to this embodiment, the retaining teeth 42a, 42b may be omitted.

Figure 8:
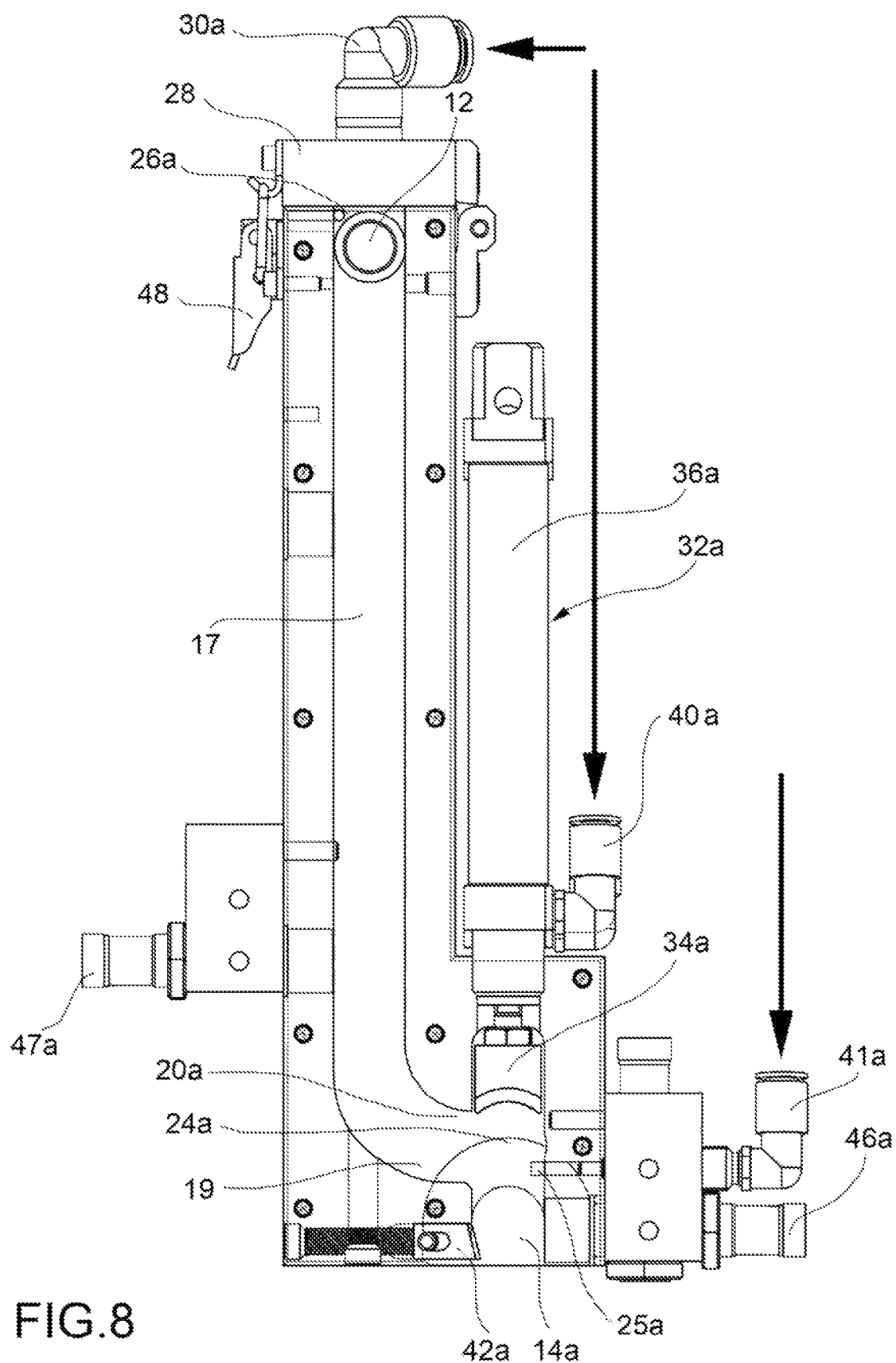
FIGS. 8 to 11 illustrate in diagrammatic form four sequential operating steps of an apparatus according to an embodiment of the invention.
Figure 9:
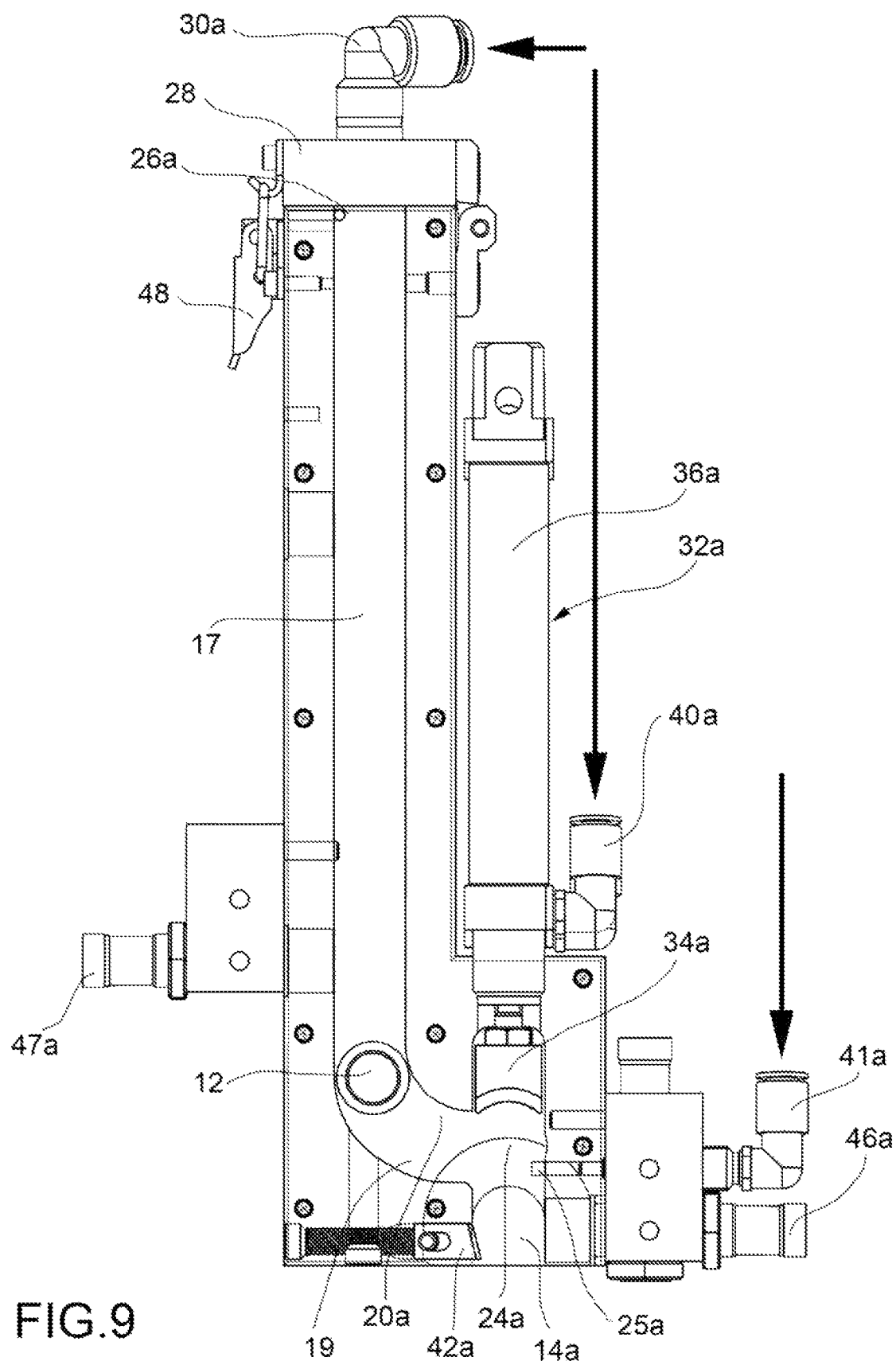
Figure 10:
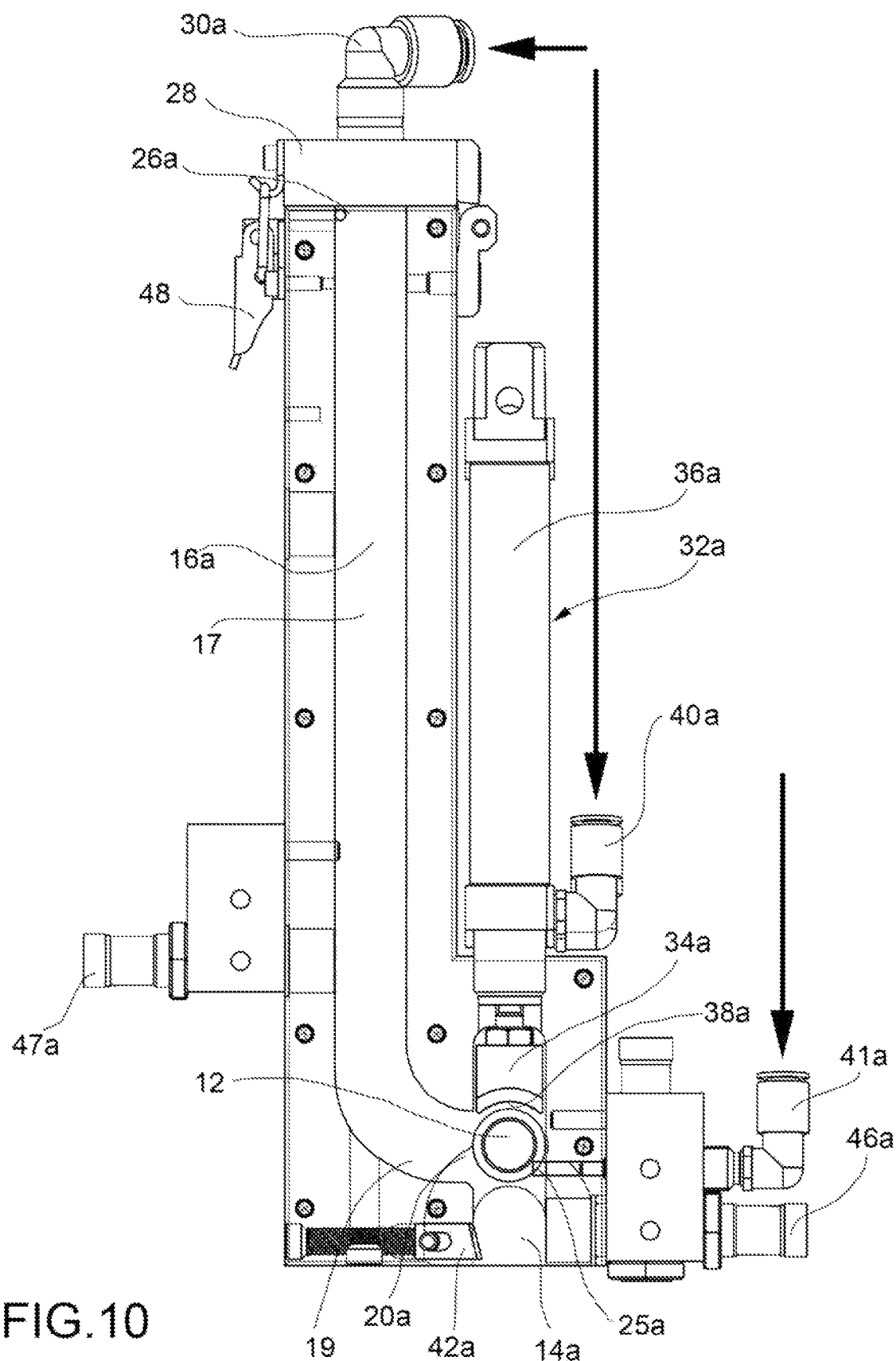

Periodically, when it is required to introduce a new electrode capsule 12, for example into the withdrawal station 14a (or 14b), compressed air is blown into through the connection 30a into the guide duct 16a, causing the electrodes to advance along the guide duct. FIG. 8 and the following figures show, purely by way of example, a single electrode capsule 12.

The piston thrust element 34a is retracted. Advantageously, the retracting movement of the piston thrust element 34a may be caused by conveying compressed air to the connection 40a using the same pneumatic impulse which is used to convey compressed air inside the guide duct 16a via the connection 30a. The pneumatic force during this operation is greater than the force of the elastic element 45a which is compressed. The stop element 25a is extended and penetrates partially into the space between the prechamber 24a and the withdrawal station 14a. Advantageously, the extension movement of the stop element 25a may be caused by conveying compressed air to the connection 41a using the same pneumatic impulse which is used to convey compressed air to the connections 30a and 40a. The pneumatic connection of the connections 30a, 40a and 41a (and the corresponding connections 30b, 40b and 41b) is preferred, but not essential for the purposes of implementation of the invention.

Figure 11:
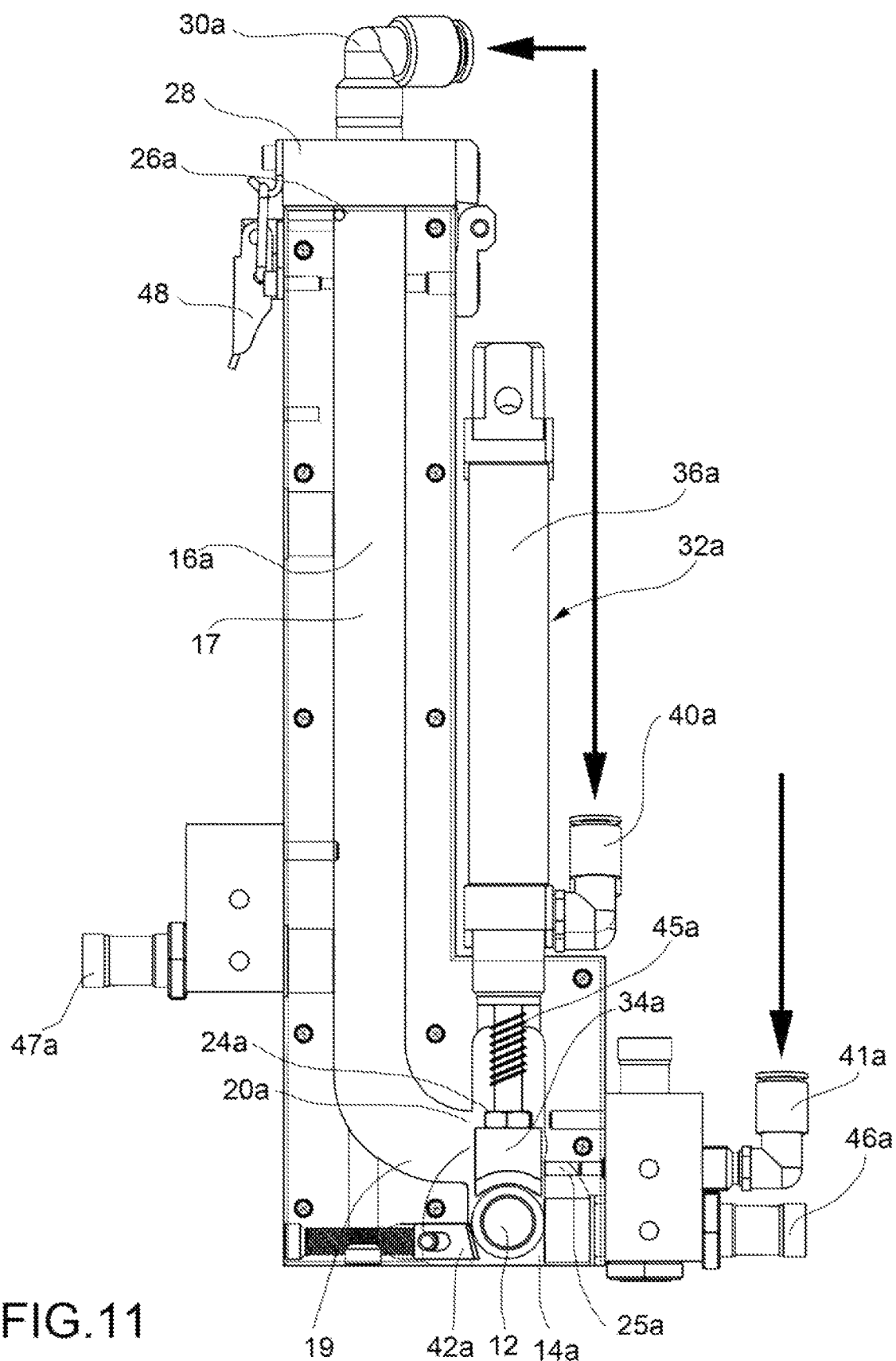

With the piston thrust element 34 in the retracted position, the first electrode capsule 12' available in the row is able to enter into the prechamber 24a, where it is retained by the stop element 25a in the extended position (FIG. 11). During this stage the withdrawal station 14a is empty and the welding gripper (not shown) may load an electrode capsule situated in the opposite withdrawal station 14b. In fact, in order to optimize loading of the electrode capsules one at a time onto the welding gripper, in one of the withdrawal stations (for example the station 14b) there must be the new electrode which the welding gripper must remove, while the opposite withdrawal station (14a) must be empty. In this way the welding gripper introduces its exposed electrode-holder stem into a new electrode capsule which is situated in the station 14b, while it may insert the other electrode (yet to be replaced or just replaced) inside the opposite station 14a. Then the welding gripper is closed with a measured clamping force in order to fit and forcibly fixed the new electrode onto the exposed electrode-holder.

In order to bring an electrode capsule into the withdrawal station 14a, the compressed-air supply to the connections 30a, 40a and 41a is interrupted. When no compressed air is conveyed to the positioning device 32a, the spring 45a causes extension of the piston thrust element 34A. The stop element 25a, no longer acted on by the compressed air, is pushed back by the electrode capsule. The piston thrust element 34a, in the advanced position, closes off the outlet end 20a of the guide duct 16a, retaining in orderly manner the other electrode capsules (not shown) contained inside the guide duct 16a and preventing them from entering the prechamber 24a and the withdrawal station 14a.

According to one embodiment, the compressed air may be blown in a practically continuous manner into the two guide ducts and interrupted momentarily only when it is required to introduce an electrode capsule into one of the two withdrawal stations.

According to a preferred embodiment, the feeding apparatus 10 comprises two detection sensors 46a, 46b, each designed to detect the presence of an electrode capsule 12. Each sensor is mounted on the feeding apparatus 10 adjacent to a respective withdrawal position 14a, 14b. Owing to this configuration, the instant the sensor 46a or 46b detects the absence of an electrode in the withdrawal station, the operator may be certain that the electrode capsule has been stably fitted onto the gripper, owing to the forced coupling action with which the electrode capsules may be removed from the feeding device.

The feeding apparatus 10 may further comprise one or more secondary sensors 47a, 47b which are conveniently associated with each guide duct 16a, 16 and are able to detect the presence of a minimum number of capsules 12 inside the associated guide duct; suitably, in order to establish the suitable time intervals for loading new capsules inside the guide ducts, when the already loaded capsules are close to being used up, the secondary sensors 47a, 47b detect the presence in the guide of a capsule ahead of the first capsule 12' so as to establish whether the withdrawal stations 14a, 14b may be continuously fed. The secondary sensors may be located so as to detect the presence of a capsule arriving two or three positions ahead of the first capsule 12'.

With reference to FIGS. 1 and 3, the lid 28 may be opened by releasing a fastening device 48. In the open position (FIG. 1), rotated through 90°, the inlet ends of the guide ducts 16a, 16b are opened and two respective rows of new electrodes contained inside a cartridge unit 50 may be loaded. The cartridge unit 50 comprises a part which can be fixed to the casing 52 and a double rod 54 by means of which the rows of electrode capsules may be pushed manually, introducing them into the guides.

Inside the guides ducts, owing to the absence of receiving compartments for the single capsules, or separation elements between two capsules, and the absence of thruster pistons for the electrode capsules, it is possible to increase the density and therefore the number of electrode capsules loaded into the feeding apparatus, thus reducing the loading frequency.

Several aspects and embodiments of the invention have been described herein. It is understood that each embodiment may be combined with any other embodiment. The invention, moreover, is not limited to the specific embodiments described, but may be varied and still fall within the scope of protection claimed herein.

The invention claimed is:

1. An apparatus for feeding electrode capsules, comprising:
   two stations for withdrawal of electrode capsules, having a mirror-image arrangement with respect to a given intermediate plane and situated in a peripheral zone of the apparatus;
   two guide ducts designed to house two respective rows of electrode capsules, each guide duct having an inlet end for introducing the electrode capsules and an outlet end close to a respective withdrawal station, the two guide ducts being parallel, aligned, and adjacent to each other;
   a cartridge unit containing two rows of electrode capsules, the cartridge unit positioned so that each row of the cartridge unit aligns with each inlet end of the guide ducts;
   a double rod element moveable within the cartridge unit, a portion of each rod element positioned within the inlet end of the guide ducts, the double rod element configured to push simultaneously the two rows of electrode capsules within the guide ducts;
   two prechambers, each adjacent to and communicating with a respective outlet end of one of the guide ducts and a respective withdrawal station, each prechamber being arranged between the associated withdrawal station and the associated guide duct;
   two pneumatically operated stop elements each able to be selectively operated so as to reach
       an active stop position, where the stop element projects at least partially between the prechamber and the respective withdrawal station, so as to prevent an electrode capsule from being transferred from the prechamber to the withdrawal station, and
       a passive or retracted position, where the stop element allows an electrode capsule to be transferred from the prechamber to the withdrawal station;
   at least two sensors for detecting the presence of an electrode capsule, said sensors being mounted on the apparatus adjacent to a respective withdrawal station;
   two positioning devices which can be selectively operated in order to transfer an electrode capsule from the respective prechamber to the associated withdrawal station, wherein the two positioning devices each comprise a piston thrust element, a respective pneumatic connection for pneumatically actuating the piston thrust element away from the respective withdrawal station, and an elastic return element associated with each piston thrust element for pushing the piston thrust element towards the respective withdrawal station, and wherein the piston thrust element in its extended position towards the withdrawal station is adjacent to the outlet of the respective guide duct so as to prevent the electrode capsules contained inside the guide duct from accessing the prechamber;
   two pneumatic connections each connected to one of the two guide ducts in the proximity of the respective inlet ends, so as to introduce selectively and independently separate compressed-gas flows into either one of the guide ducts so that the com pressed-gas flows directly push the electrode capsules contained in the chosen guide duct and cause them to advance towards the respective withdrawal station, wherein each of the pneumatic connections of the two guide ducts is in fluid communication with a supply of compressed air to the connection for causing retraction of the piston thrust element acting on the electrode capsules supplied by the associated guide duct, and wherein the stop elements are operated pneumatically via a respective pneumatic connection, each of which is in fluid communication with the pneumatic connection of the associated guide duct and with the pneumatic connection of the associated positioning device so that
   the sending of pressurised air to the three pneumatic connections connected to each other causes the advancing movement of the electrode capsules inside the associated guide duct and the movement of the piston thrust element away from the respective withdrawal station and brings the associated stop element into its active stop position, and interruption in the sending of pressurised air to the three pneumatic connections connected to each other causes the stoppage of the electrode capsules inside the associated guide duct and the movement of the piston thrust element, due to a biasing action of the associated elastic return element, towards the respective withdrawal station and brings the associated stop element into its passive or retracted position.

2. The apparatus of claim 1, wherein the withdrawal stations are arranged in peripheral positions close to an edge of the feeding apparatus;

the prechambers are located adjacent to and communicating with the withdrawal stations arranged more internally in the apparatus and farther from the edge than the withdrawal stations; and the positioning devices act pushing the electrode capsules in a direction which forms a right angle with a direction of an end section of the guide ducts at the outlet.

3. The apparatus of claim 1, wherein the guide ducts have a substantially L-shaped form in plan view, with a longer straight section which starts with the inlet end and is parallel and adjacent to one of the positioning devices, and a shorter end section bent at an angle and terminating with the outlet end.

4. The apparatus of claim 1, wherein the inlet ends of the two guides can be closed by at least one lid.

5. The apparatus of claim 4, wherein the two pneumatic connections, which are each connected to a guide duct, are mounted on the lid.

6. The apparatus of claim 1, wherein each piston thrust element has a concave surface directed towards the respective withdrawal station so as to keep a respective electrode capsule oriented in a predetermined direction inside the withdrawal station.

7. The apparatus of claim 6, wherein the concave surfaces of the piston thrust elements lie on two partially cylindrical geometrical surfaces having respective axes which form a predetermined obtuse angle ($\alpha$) with each other.

* * * * *